United States Patent [19]

Bonerb et al.

[11] E Patent Number: Re. 32,232

[45] Reissued Date of Patent: Aug. 26, 1986

[54] BIN FOR FREE FLOWING MATERIAL

[76] Inventors: Timothy C. Bonerb; Vincent C. Bonerb, both of P.O. Box 2100, Buffalo, N.Y. 14219

[21] Appl. No.: 621,868

[22] Filed: Jun. 18, 1984

Related U.S. Patent Documents

Reissue of:

[64] Patent No.: 4,421,250
Issued: Dec. 20, 1983
Appl. No.: 257,604
Filed: Apr. 27, 1981

[51] Int. Cl.[4] ..... B65D 88/62

[52] U.S. Cl. ..... 222/95; 222/105; 222/386.5; 222/389

[58] Field of Search ..... 222/95, 105, 203, 386.5, 222/389; 52/197

[56] References Cited

U.S. PATENT DOCUMENTS

| | | | |
|---|---|---|---|
| 1,570,795 | 1/1926 | Tainton . | |
| 2,646,905 | 7/1953 | Vincent | 222/200 |
| 2,732,099 | 1/1956 | Davis | 91/275 X |
| 2,792,262 | 5/1957 | Hathorn | 222/203 X |
| 2,931,523 | 4/1960 | Nelligan | 222/389 X |
| 2,956,839 | 10/1960 | Hermanns | 222/386.5 |
| 3,097,766 | 7/1963 | Biehl et al. | 222/135 |
| 3,199,726 | 8/1965 | Pierson | 222/1 |
| 3,209,894 | 10/1965 | Baechli | 222/386.5 X |
| 3,273,761 | 9/1966 | Langen | 222/386.5 |
| 3,351,235 | 11/1967 | Paton | 222/95 X |
| 3,396,762 | 8/1968 | Paton | 222/386.5 X |
| 3,421,663 | 1/1969 | Paton | 222/386.5 X |
| 3,421,665 | 1/1969 | Paton | 222/386.5 |
| 3,456,834 | 7/1969 | Paton | 222/386.5 X |
| 3,502,240 | 3/1970 | Paton | 222/386.5 X |
| 3,858,772 | 1/1975 | Myers | 222/460 |
| 3,941,258 | 3/1976 | Ide | 222/386.5 X |

FOREIGN PATENT DOCUMENTS

| | | | |
|---|---|---|---|
| 650189 | 11/1964 | Belgium | 222/386.5 |
| 1531920 | 1/1970 | Fed. Rep. of Germany | 414/288 |
| 2351425 | 4/1974 | Fed. Rep. of Germany | 222/203 |
| 2705689 | 8/1978 | Fed. Rep. of Germany | 222/203 |
| 1089874 | 11/1967 | United Kingdom | 222/386.5 |
| 1144162 | 3/1969 | United Kingdom | 52/197 |

*Primary Examiner*—Joseph J. Rolla
*Assistant Examiner*—Frederick R. Handren
*Attorney, Agent, or Firm*—Bernard, Rothwell & Brown

[57] ABSTRACT

A bin made of flexible bag material is disclosed for containing granular free flowing material and for discharging the entire mass of stored material remaining in the bin after discharge by gravity alone. The granular material is intially discharged through a discharge port of the bin by gravity until the remaining granular material forms a cone shape at its angle of repose and stops flowing out the discharge port. The bin is further emptied by forcing air into the bag to inflate an inner membrane until the remaining contents of the bin are fully discharged.

6 Claims, 7 Drawing Figures

BIN FOR FREE FLOWING MATERIAL

Matter enclosed in heavy brackets [ ] appears in the original patent but forms no part of this reissue specification; matter printed in italics indicates the additions made by reissue.

FIELD OF THE INVENTION

This invention relates to a bin for containing and discharging free flowing granular materials made of a flexible inflatable bag having an inner membrane and an outer membrane.

BACKGROUND OF THE INVENTION AND PRIOR ART

Free flowing granular material, for instance, sugar, is often stored or contained in silos or bins having rigid walls and bottoms made of metal or some other rigid material. A discharge port is generally provided in the bottom of such a bin or silo, which, when opened, permits the material in the container to flow out. From the discharge port, the material may be conveyed away by a conveying means such as a screw conveyor. If the bottom of the silo or bin, extending from the discharge port to the walls, is flat or horizontal, not all of the free flowing granular material will be discharged through the discharge port by gravity. It is a characteristic of free flowing granular material contained in a flat bottomed bin or silo to stop flowing out the discharge port when the material remaining in the bin is at an angle of repose. The material remaining in the bin after discharge by gravity, forms a cone shape inside the silo. The inner face of this cone shape, formed by the free flowing granular material, extends from the discharge port in the bottom of the silo upward at an angle to the wall of the silo or bin. The angle of repose at which this cone shape occurs and discharge by gravity ends depends on the physical characteristics of the material involved.

To ensure the discharge of the entire contents of a bin, bins have been provided with hopper bottoms. These hopper bottoms are cone-shaped, extending upward from the discharge port at an angle towards the bin or silo walls. The angle at which the hopper bottom projects from the discharge port to the bin wall is sufficient to prevent the material in the bin from resting in a cone shape at an angle of repose and to direct the entire contents of the bin towards the discharge port for removal. With a hopper bottom, all of the material placed in the silo or bin is discharged when the discharge port is opened because it cannot form a cone at an angle of repose. The cone shape of the silo bottom, however, concentrates the weight of the free flowing granular material on a smaller area than a flat bottomed silo or bin of the same size. In addition, a bin with a hopper bottom has a higher center of gravity than the same sized bin with a flat bottom. This higher center of gravity may not be a significant problem in stationary bins, but may be of greater importance in a mobile bin or container. Moreover, a hopper shaped bin is expensive and wasteful of space.

Some prior art has used pneumatically movable flexible membranes inside containers to move the materials in the container's. However none of such prior art has, to applicants, knowledge, been even suggestive of using a flexible membrane as the storage bin and pneumatic pressure inside a bag shaped membrane to move stored materials from this angle of repose toward a discharge opening.

SUMMARY OF THE INVENTION

This invention, provides a bin for containing free flowing granular material made of a flexible, inflatable bag having an inner membrane and an outer membrane engaged to form an air tight space between the two membranes. The bag is suspended from a framework which holds the bag in an open position forming a bin having sides and a bottom. The bottom of the bin rests on a support member, such as a floor or other supporting structure. A closeable discharge port is provided in the bottom of the bin through which the material stored or contained in the bin is discharged. When the material in the bin reaches its angle of repose, and stops flowing out of the discharge port, air is forced through an air inlet into the bag to inflate the inner membrane and complete the discharge operation.

DETAILED DESCRIPTION OF THE INVENTION

Figure 1:
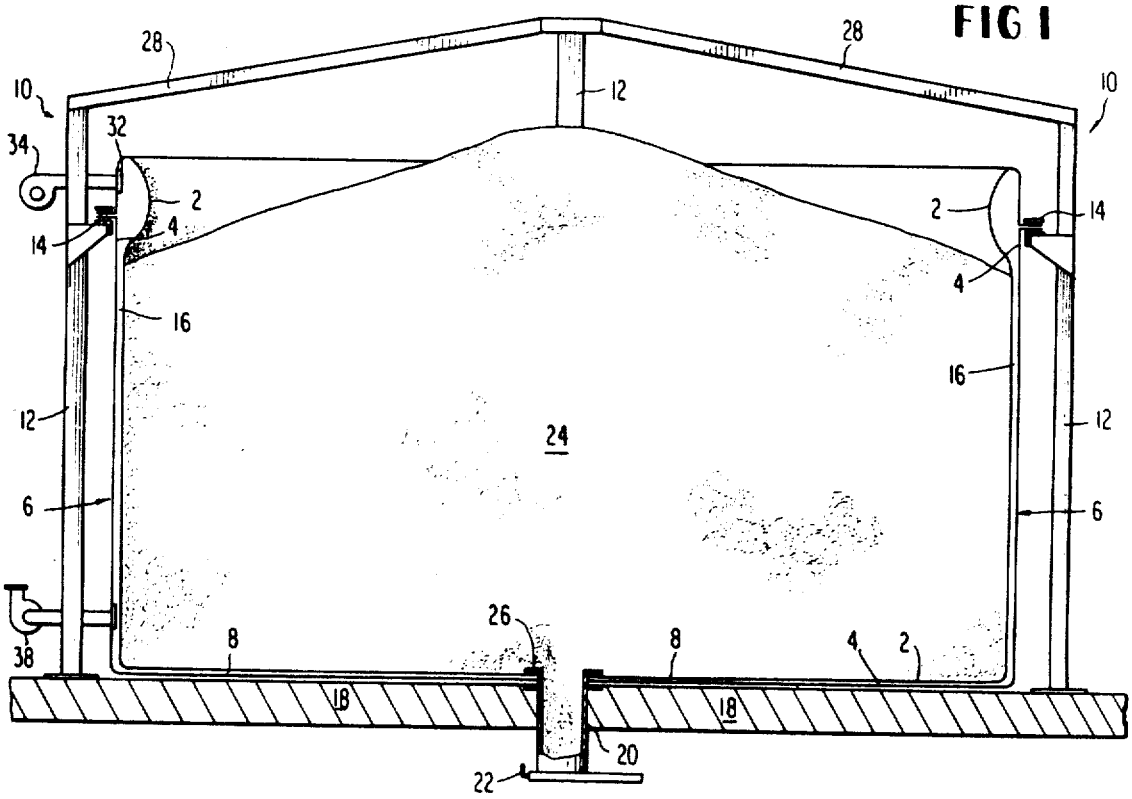
FIG. 1 is a sectional view of a bin constructed in accordance with this invention filled with free flowing granular material.

Referring to FIG. 1, there is shown a bin constructed, in accordance with this invention, of a flexible bag with an inner membrane 2 and an outer membrane 4 which form the bin sides 6 and bottom 8. To hold the bag upright in an open position, the bag is attached to a framework 10. Preferably, the framework for large free standing stationary bins has pillars 12 which are spaced apart and support an upper clamp 14 which engages the inner membrane and the outer membrane of the bag. In this manner, a substantially air tight space 16 is formed between the two engaged membranes. The pillars 12 may be made of any rigid material, such as metal or wood, that will support the upper clamp 14 and the bag. The bottom of the bag should rest on a flat support member 18, such as a floor.

Figure 2:
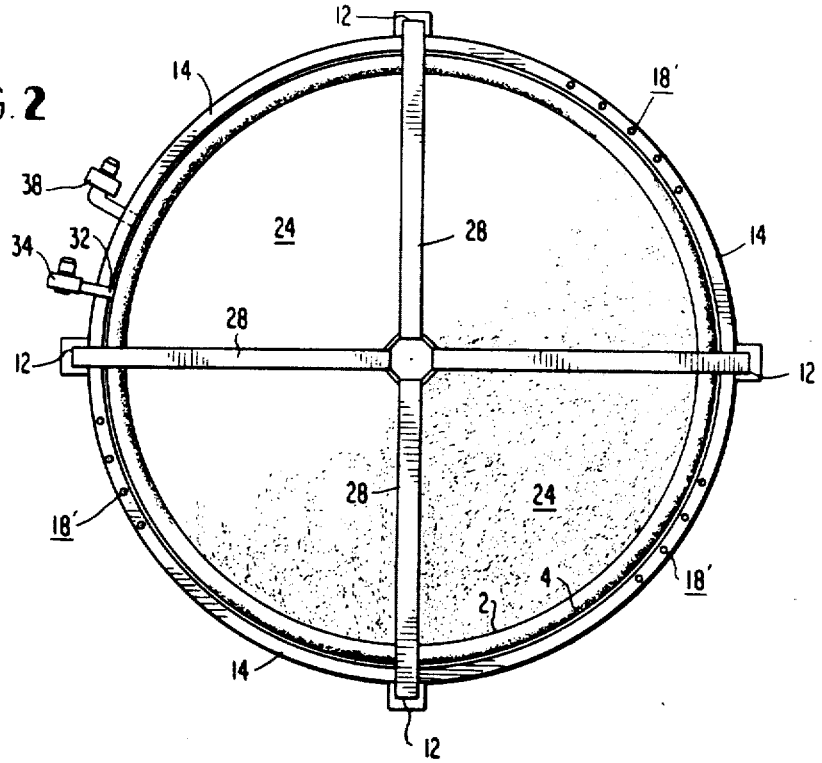
FIG. 2 is a top view of a bin constructed in accordance with this invention filled with free flowing granular material.

The upper clamp 14 may be any device which holds the membranes together to form an air tight space 16 and which can support the bin sides in an upright, open position. As shown in FIGS. 1 and 2, the clamp 14 may consist of two rigid strips made, for instance, of metal. The two membranes are placed between the metal strips and the metal strips are pressed together to engage the membranes of the bag in an air tight relationship. Fasteners [18] *18'*, such as threaded bolts, may be used to tighten the clamp 14 and grommets may be provided in the membranes for reinforcement.

The framework may be constructed in any manner which supports the bag in an upright open position and holds the membranes of the bag together in an air tight relationship. The number of pillars used, or whether pillars will be used at all, will depend on the size of the bin, whether it is mobile or stationary and many other factors. For instance, if the bag is used in conjunction with trucks or other suitable vehicles to form a flat bottomed mobile bin or silo, the framework may consist of a clamp, attached to the walls or ceiling of the vehicle storage compartment, which extends around the entire perimeter of such storage compartment. The bag could then be suspended from the clamp within the storage compartment. A bottom portion of the bag should rest on a supporting member, such as a floor, and extend outward horizontally from the discharge port.

A discharge port 20 extends through both the inner membrane 2 and the outer membrane 4 of the bag and may be opened and closed by a gate 22 to control the gravity discharge of free flowing granular material 24. The discharge port is also provided with a lower clamp 26 which engages the inner membrane and the outer membrane of the bag in a substantially air tight relationship.

Beams 28 extend from the pillars 12 of the framework 10 to an area above the middle portion of the bin. From these beams, a tarp or other cover (not shown) may be suspended above the bin to protect the material contained within the bin from contamination. Other means of covering the bin may be used without changing the function of this invention.

Figure 3:
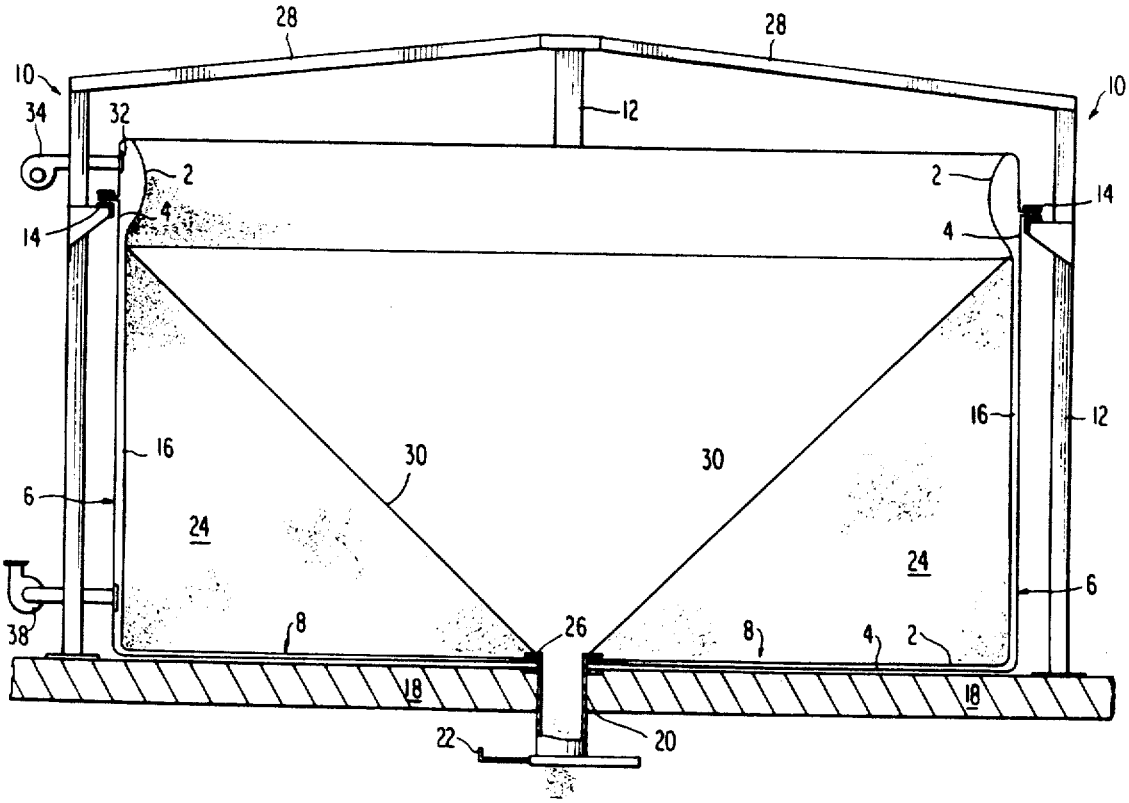
FIG. 3 is a sectional view of a bin constructed in accordance with this invention in which a discharge port has been opened and the free flowing granular material has been discharged until the remaining material is at an angle of repose.

The free flowing granular material 24 for which the bin of this invention is constructed may be any dry flowable solid consisting of discrete particles which assume an angle of repose when discharged from a flat bottomed bin. Free flowing granular material 24 at an angle of repose is illustrated in FIG. 3. Examples of free flowing granular material are sugar, salt or grain but any solid particulate matter which forms an angle of repose is encompassed within the term free flowing granular material.

The bag may be of any flexible material but is preferably not elastic and it must not contaminate the contents of the bin. Such flexible bag material is commercially available, and material including a combination of nylon and polyethylene has been found to have suitable characteristics for use in this invention. The size of the bag used in this invention will necessarily depend on the nature of the free flowing material, the size of the area in which the bin is located and many other factors. For instance, a bin located in a warehouse may have a diameter of 16 to 18 feet and the sides of the bin may extend upward 8 to 10 feet from the bottom. But the dimensions of a bag used to form a bin within the storage area of a vehicle would be determined by the size of that storage area. It will also be understood that the drawings illustrate the relationship between the parts that comprise this invention and in practice the inner and outer membranes will be forced together by the material contained within the bin where it contacts the inner membrane.

To discharge the free flowing granular material from a bin constructed in accordance with this invention the gate 22 of the discharge port 20 must be opened. The contents of the bin may then flow out of the opened discharge port to be carried away by a conveying means (not shown), such as a screw conveyor, or to be discharged into a moveable container for transport to a different area. The free flowing granular material continues to flow out of the bin through the discharge port until the angle of repose for the particular material in the bin is reached, as shown in FIG. 3. At the angle of repose, the inner face 30 of the free flowing material 24 assumes an inverted cone shape with its apex at the discharge opening and discharge of the material by gravity stops.

Figure 4:
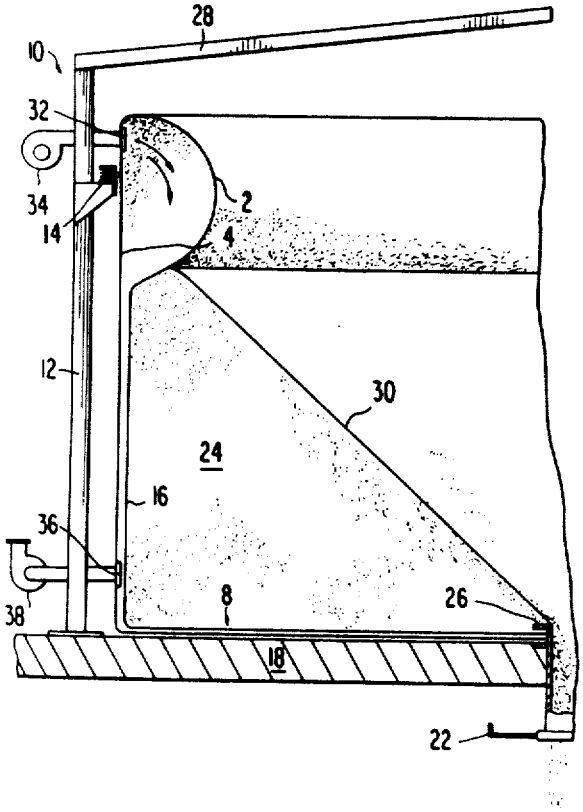
FIG. 4 is a sectional view of a bin constructed in accordance with this invention with the inner membrane partially inflated.

To overcome the angle of repose and complete the discharge operation, air is forced into the air tight space between the inner membrane and the outer membrane through an air inlet 32 as illustrated in FIG. 4. The inner membrane 2 begins to inflate and bulge towards the inner part of the bin. This inflation forces the free flowing granular material 24 nearest the top of the cone to cascade or avalanche down the cone towards the discharge port 20 and finally out of the bin. It has been found that the outer 4 membrane does not inflate outward to an extent that would inhibit the operation of this invention even when no rigid outer wall is present. The outer membrane is held in a stable upright position by the upper clamp and the weight of the material remaining in the bin. The upper portion of the inner membrane near the clamp may move freely towards the inner part of the storage area in response to the air flowing through the air inlet. Even small levels of pressure between the inner membrane and outer membrane are sufficient to overcome the limited resistance caused by the small quantity of granular free flowing material adjacent the inner membrane at the top of the inverted cone.

Figure 5:
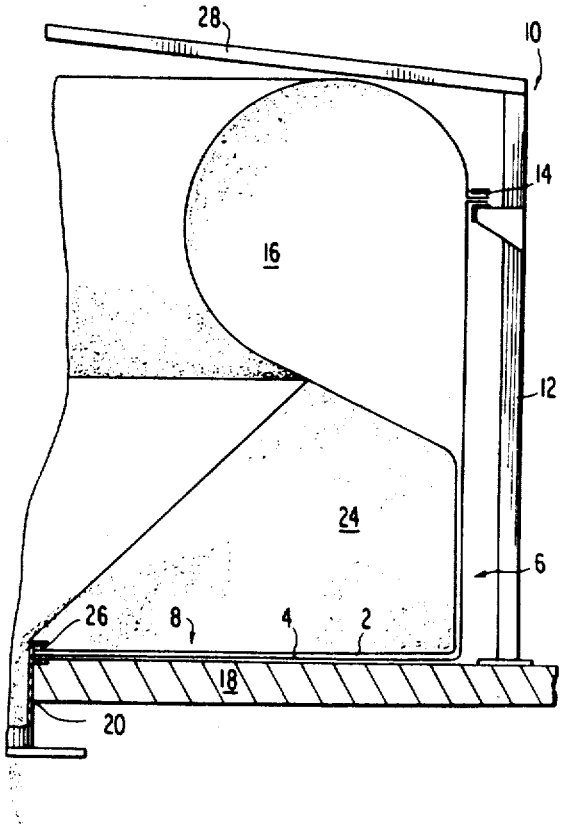
FIG. 5 is a sectional view of a bin constructed in accordance with this invention wherein the inner membrane has been more fully inflated than in FIG. 4 to discharge more of the remaining free flowing material.
Figure 6:
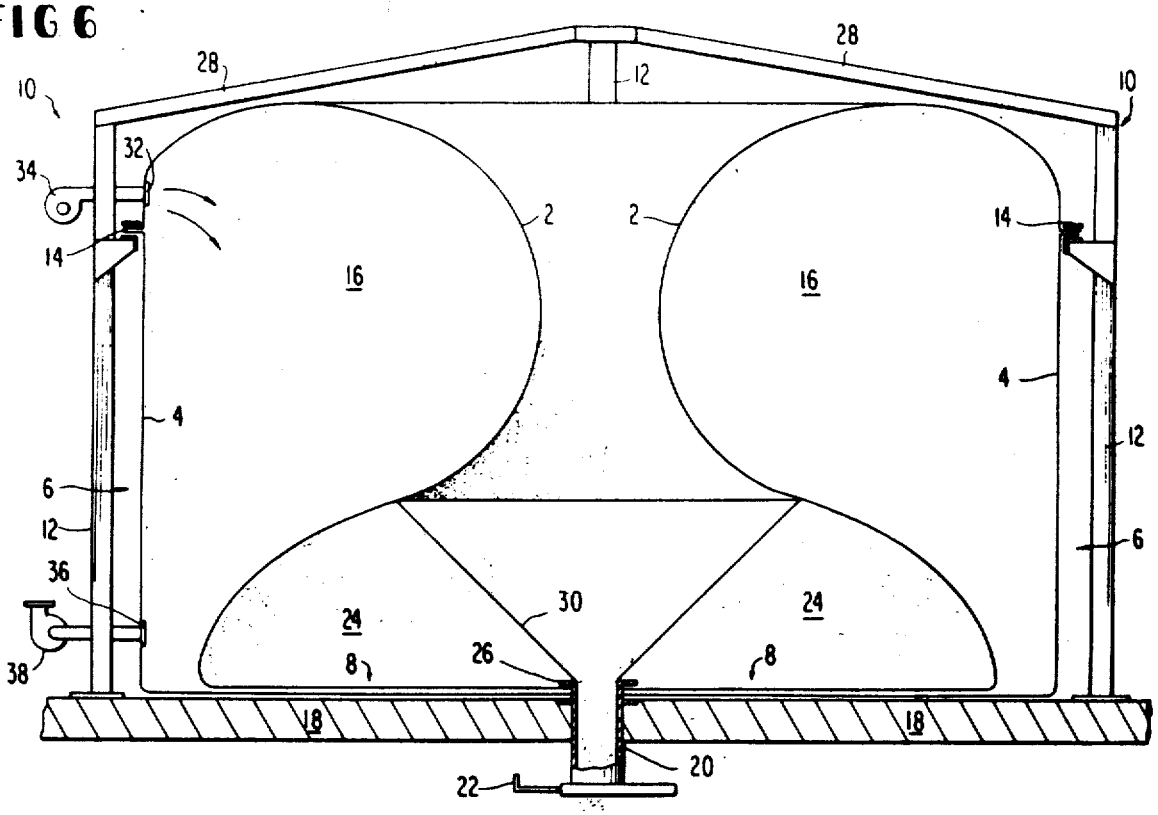
FIG. 6 is a sectional view of a bin constructed in accordance with this invention wherein the inner membrane of the bag is more fully inflated than in FIG. 5.
Figure 7:
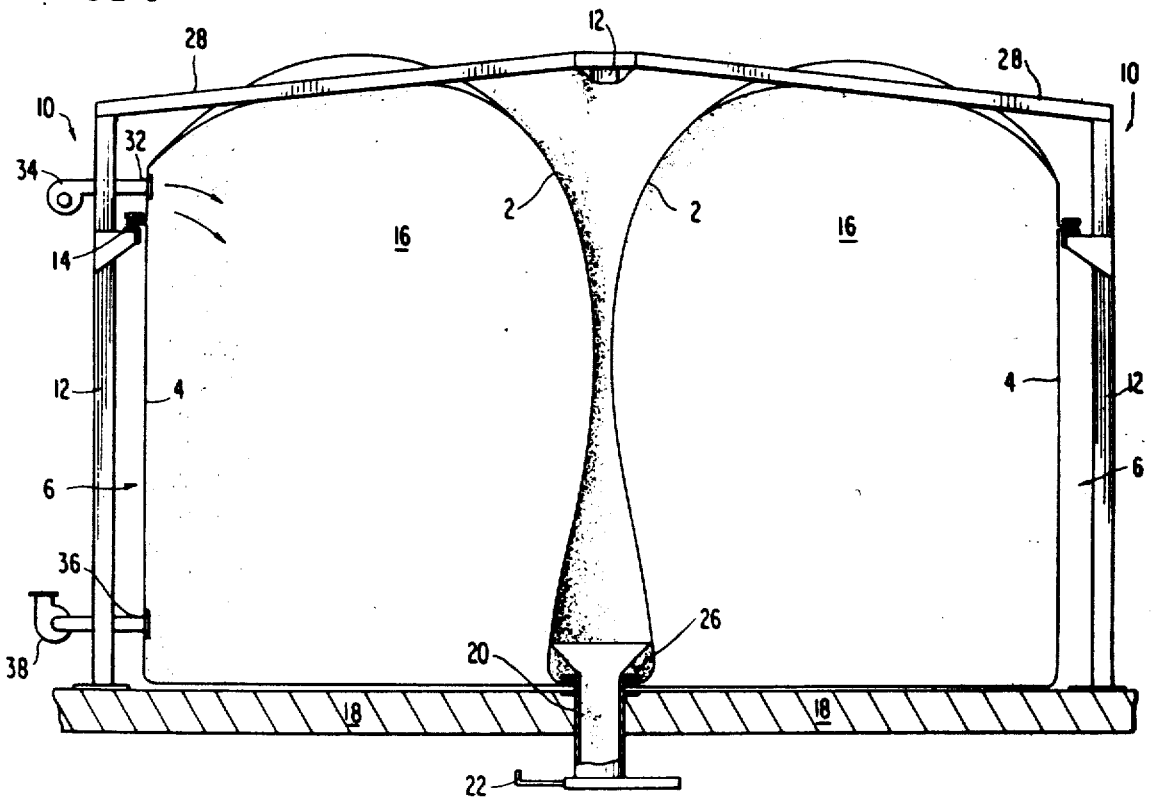
FIG. 7 is a sectional view of a bin constructed in accordance with this invention wherein the inner membrane of the bag is fully inflated and substantially all of the remaining free flowing granular material has been discharged.

As air continues to enter the space between the inner membrane and the outer membrane, the inner membrane inflates and extends further towards the center of the storage area as shown in FIGS. 4 and 5 and 6 until full inflation is achieved, as shown in FIG. 7, and substantially the entire contents of the bin are discharged through the discharge port.

The air inlet 32 is preferably positioned above the line where the material contained within the bin touches the sides of the bag. This position of the air inlet above the contents of the bin ensures that the inner membrane 2 will encounter the least possible resistance to inflation. The air may be forced into the bag by a blower 34 such as a compressor, or simply by a fan since even a low level of pressure will overcome the resistance of the free flowing granular material 24 at the top of the cone. For example, in an initial reduction to practice only about 0.5 psi air pressure was required.

Deflation of the bag after discharge is completed is not necessary before refilling the bin. With the discharge port gate 22 closed after complete discharge, free flowing granular material may be loaded directly into the inflated bin. The pressure exerted by the material as it enters and fills the bin forces the air out of the space between the inner membrane 2 and outer membrane 4 through air outlet 36. But the bag may be deflated by removing the air via air outlet with a blower 38 to speed the removal of air.

By forming the bin of this invention from flexible bag material, a substantial amount of weight is eliminated since rigid material such as metal, is not required for the bottom or sides. In addition, the flat bottom provided by the bag structure distributes the weight of the free flowing material over a large surface area. The light weight of bins constructed in accordance with this invention and the distribution of weight over a large surface area, helps maximize the amount of free flowing granular material that can be stored in a limited space. The reinforcements required to install bins on elevated support members, such as upper floors of warehouses, may therefore be decreased by this invention. A further advantage of the bin constructed in accordance with this invention is that the bag material may be substantially cheaper than the rigid material used to construct silos or bins and the contents of the flat bottomed bin of this invention may be fully discharged in a simple manner.

What is claimed is:

1. A bin for free flowing granular material having a bottom resting on a support member and sides extending upwardly from said bottom, the bin comprising:

(a) a generally cup-shaped, open top, double walled, flexible *inflatable* bag having an inner membrane and an outer membrane, *both with side walls and* both of impervious material, forming the double wall;

(b) framework means for suspending the bag in an open position without providing any lateral support for the outer membrane of the bag, the top of the bag forming the top of the bin;

(c) clamp means carried by the framework means for clamping the bag adjacent the top edge thereof to thereby support and hang the side walls of the [membrane] *membranes* vertically so as to provide side walls without lateral support;

(d) a closable discharge port in the bottom of said bin extending through said inner membrane and said outer membrane and engaging said inner membrane and said outer membrane to form a substantially air tight space between said inner membrane and said outer [membrane] *membranes*, said closable discharge port allowing the free flowing granular material to drain from the bin for emptying the same down to the angle of repose of the free flowing granular material when the closable discharge [part] *port* is opened, thereby *causing the material to form an inner face having a generally inverted conical shape* creating a void of inverted conical shape within the original mass of the granular free flowing material with the apex of the inverted conical shape at the closable discharge port; and (e) air inlet and outlet [passages] *passage means* through which air is forced or withdrawn between the inner membrane and the outer membrane;

(f) means to inflate the [closed173 *inflatable* bag with fluid under controlled pressure so that the *inner membrane of the* bag will expand against the top edge *of* the granular free flowing material remaining after creating the void of inverted conical shape [void] to force this material into the void and hence down the closable discharge opening, so that the bag will continue to expand downwardly and inwardly until *substantially* all of the granular free flowing material is gradually forced into the inverted conical [shaped] *shape* void and out of the closable discharge port.

2. A bin for free flowing granular material as recited in claim 1 wherein said discharge port includes annular clamp means for engaging said inner membrane and said outer membrane.

3. A bin for free flowing granular material as recited in claim 1 wherein the clamp means forms a circular perimeter and gravity holds the [sides] *side walls* of said bin in a substantially cylindrical shape.

4. A bin as recited in claim 1 wherein said discharge port is positioned centrally in the bottom of said bin.

5. A bin for storing free flowing granular materials on a flat horizontal [floor] surface and emptying such materials from the bin, the materials having an angle of repose, the bin comprising:

(a) an air tight, flexible, cup-shaped, double walled *inflatable* bag capable of supporting free flowing granular material thereon and capable of containing fluid under pressure therein, *both walls of the bag including side walls* the [top of the] bag [forming] *having a top which forms* the top of the bin, *the bin having a bottom*;

(b) a flat horizontal [floor] surface supporting the bag;

(c) skeletal bag support means supporting the bag from adjacent the top thereof so that the side walls of the bag without lateral support form a cup-shaped bin to be occupied by a [sotrage] *storage* mass of the granular free flowing material;

(d) a closable discharge opening extending through the bag and located in the bottom of the bin to allow the free flowing granular material to drain from the bin for emptying the same down to the angle of repose of the free flowing material when the closable opening is opened, thereby *causing the material to form an inner face having a generally inverted conical shape* creating a void of inverted conical shape within the original mass of the granular free flowing material with the apex of the inverted conical shape at the closable opening; and (e) means to inflate the [closed] *inflatable* bag with fluid under controlled pressure so that [the] *an inner wall of the double walled* bag will expand from the top downwardly and inwardly against the top edge of the granular free flowing material remaining after creating the void of inverted conical shape to gently roll the material at the top into the void and hence down the closable discharge opening, so that the bag will continue to expand downwardly and inwardly until *substantially* all of the granular free flowing material is gradually moved into the inverted conical shaped void and out of the closable discharge opening.

*6. A bin for storing free flowing granular materials on a flat horizontal support surface and emptying such materials from the bin, the materials having an angle of repose, the bin comprising:*

*(a) an air tight, flexible, cup-shaped, double walled, inflatable bag capable of supporting free flowing granular material thereon and capable of containing fluid under pressure therein, both walls of the bag including side walls, the bag having a top which forms the top of the bin the bag having an inner and an outer wall, the bin having a bottom;*

*(b) skeletal bag support means supporting the bag from adjacent the top thereof so that the side walls of the bag without lateral support form a cup-shaped bin to be occupied by a storage mass of the granular free flowing material;*

(c) *a closable discharge opening extending through the bag and located in the bottom of the bin to allow the free flowing granular material to drain from the bin for emptying the same down to the angle of repose of the free flowing material when the closable opening is opened, thereby causing the granular material to form an inner face having a generally inverted conical shape and creating a void of inverted conical shape within the original mass of granular free flowing material with the apex of the inverted conical shape at the closable opening; and*

(d) *means to inflate the inflatable bag with fluid under controlled pressure so that an inner wall of the double-walled bag will expand from the top downwardly and inwardly against the top edge of the granular free flowing material remaining after creating the void of inverted conical shape to gently roll the material at the top into the void and hence down the closable discharge opening, so that the bag will continue to expand downwardly and inwardly until substantially all of the granular free flowing material is gradually moved into the inverted conical shaped void and out of the closable discharge opening.*

* * * * *

UNITED STATES PATENT AND TRADEMARK OFFICE

CERTIFICATE OF CORRECTION

PATENT NO. : Re. 32,232

DATED : August 26, 1986

INVENTOR(S) : TIMOTHY C. BONERB, VINCENT C. BONERB

It is certified that error appears in the above-identified patent and that said Letters Patent is hereby corrected as shown below:

Column 6, line 19, "walls the" should be --walls, the--

Column 6, line 62, "bin the" should be --bin, the--

Signed and Sealed this

Thirtieth Day of December, 1986

*Attest:*

DONALD J. QUIGG

*Attesting Officer*

*Commissioner of Patents and Trademarks*